US011181264B2

(12) United States Patent
Karjunen

(10) Patent No.: US 11,181,264 B2
(45) Date of Patent: Nov. 23, 2021

(54) DETECTION OF LEAKAGE IN RECOVERY BOILER

(71) Applicant: Varo Teollisuuspalvelut Oy, Helsinki (FI)

(72) Inventor: Timo Karjunen, Helsinki (FI)

(73) Assignee: Varo Teollisuuspalvelut Oy, Helsinki (FI)

( * ) Notice: Subject to any disclaimer, the term of this patent is extended or adjusted under 35 U.S.C. 154(b) by 272 days.

(21) Appl. No.: 16/406,457

(22) Filed: May 8, 2019

(65) Prior Publication Data

US 2019/0346131 A1 Nov. 14, 2019

(30) Foreign Application Priority Data

May 11, 2018 (FI) ..................................... 20185437

(51) Int. Cl.

| | |
|---|---|
| ***F22B 37/42*** | (2006.01) |
| ***F22B 37/62*** | (2006.01) |
| ***G01M 3/22*** | (2006.01) |
| ***G01M 3/24*** | (2006.01) |
| ***G01M 3/28*** | (2006.01) |

(52) U.S. Cl.

CPC .......... *F22B 37/421* (2013.01); *F22B 37/426* (2013.01); *F22B 37/62* (2013.01); *G01M 3/22* (2013.01); *G01M 3/24* (2013.01); *G01M 3/28* (2013.01)

(58) Field of Classification Search

CPC ............. G01M 3/22; G01M 3/24; G01M 3/28

USPC ..................................................... 73/40–49.8

See application file for complete search history.

(56) References Cited

U.S. PATENT DOCUMENTS 2,852,459 A * 9/1958 Williamson .......... G01M 3/228 73/40.5 R
3,087,327 A * 4/1963 Kägi ......................... F28D 7/08 73/40.7
3,161,464 A * 12/1964 Mildh ....................... B03C 3/88 110/216
3,425,264 A * 2/1969 Hans ..................... G01M 3/228 73/40.5 R
3,975,943 A * 8/1976 Brachet ................. G01M 3/228 73/40
4,199,975 A * 4/1980 Schrock ............... G21C 17/002 73/40.7

(Continued)

FOREIGN PATENT DOCUMENTS

JP 2001336705 A * 12/2001

OTHER PUBLICATIONS

OnGuard iController, Solenis, LLC., 2015. (Year: 2015).*

(Continued)

*Primary Examiner* — David A. Rogers

(74) *Attorney, Agent, or Firm* — Ziegler IP Law Group, LLC

(57) ABSTRACT

A method, system and computer program for detecting a boiler leakage, in which the automation system of the recovery boiler receives an indication of a need to start the automatic sequence and starts an automatic sequence with the following functions: stopping the dosing of the tracer into the boiler water, stopping the exhaust purge flow of the boiler water, monitoring a property of the boiler water over the duration of the inspection period and drawing a conclusion regarding the leakage on the basis of said monitoring.

19 Claims, 4 Drawing Sheets

63 F4 41 55 45 54 36 33 32 31 F2 P2 86 67 35 73 75 80 25 23 21 PO4 F3 F1 22 53 P1 51

(56) References Cited

U.S. PATENT DOCUMENTS 4,226,113 A * 10/1980 Pelletier ................ G01M 3/228 73/40.7
4,249,413 A * 2/1981 Denis ...................... G01M 3/38 165/11.1
4,316,420 A * 2/1982 Kochey ................... F22B 35/00 110/187
4,380,168 A * 4/1983 Ibe ............................ F17D 5/04 376/250
4,462,319 A * 7/1984 Larsen ................... A62C 31/22 110/238
4,524,607 A * 6/1985 Pelletier ................ G01M 3/228 73/40.5 R
5,006,311 A * 4/1991 Hoots ................ G01N 33/1813 210/745
5,022,265 A * 6/1991 Voss ...................... G01M 3/202 73/40.7
5,041,386 A * 8/1991 Pierce ................... F22B 37/565 436/50
5,304,800 A * 4/1994 Hoots ................... G01M 3/228 250/302
5,320,967 A 6/1994 Avallone et al.
5,363,693 A * 11/1994 Nevruz ................. F22B 37/421 73/40
5,416,323 A * 5/1995 Hoots ................... G01M 3/228 250/302
5,663,489 A * 9/1997 Thungstrom ......... G01M 3/228 422/62
5,817,927 A 10/1998 Chen et al.
5,989,387 A * 11/1999 Hyoty ................ D21C 11/0007 162/15
6,076,048 A 6/2000 Gunther et al.
6,435,138 B2 * 8/2002 Shimada ............... F22B 1/1815 122/7 R
6,484,108 B1 * 11/2002 Burgmayer ........... F22B 37/421 702/29
7,039,555 B2 * 5/2006 Lang ....................... F22B 35/18 702/183
7,150,180 B2 * 12/2006 Werner ................... G01M 3/22 73/40.7
7,197,914 B2 * 4/2007 Maresca, Jr. ........... G01M 3/22 73/40.7
7,587,994 B2 * 9/2009 Raukola ................. D21C 11/12 122/7 R
8,291,748 B2 * 10/2012 Kumar ................ G01M 3/3227 73/40.7
8,342,006 B2 * 1/2013 Getto .................. G01M 3/2807 73/40
8,607,718 B2 * 12/2013 Wessel ...................... F23G 7/04 110/238
10,655,849 B2 * 5/2020 Mansikkasalo ............ F23J 1/00
2004/0128111 A1 * 7/2004 Lang ....................... F23N 5/003 702/188
2007/0051165 A1 * 3/2007 Maresca, Jr. ........... G01M 3/22 73/40.5 R
2018/0313531 A1 * 11/2018 Loschkin .................. F22G 7/14
2018/0363900 A1 * 12/2018 Mansikkasalo ...... D21C 11/066
2019/0040577 A1 * 2/2019 Smyrniotis ............ D21C 11/12
2019/0078773 A1 * 3/2019 Roppanen ............. F22B 21/002

OTHER PUBLICATIONS

Saurabh Agrawal, "What is the difference between a boiler and boiler drum?", available on the internet at https://www.quora.com/Why-is-phosphate-dosing-done-in-a-boiler, 2017. (Year: 217).*
Lauri Kouvo, "Advanced Leak Detection System for Recovery Boilers", LUT University School of Energy Systems, Apr. 1, 2019. (Year: 2019).*
Finnish Patent Office, Search Report, Application No. 20185437, dated Dec. 7, 2018, 1 page.
Timo Karjunen et al., "In-Service Tightness Monitoring Systems for Soda Ash Boilers", Finnish Recovery Boiler Association, 51 pages, Sep. 19, 2017.

* cited by examiner

DETECTION OF LEAKAGE IN RECOVERY BOILER

FIELD

The aspects of the disclosed embodiments relate to monitoring the tightness of a recovery boiler.

BACKGROUND

In forestry industry, the central component of the steam turbine power plants is the recovery boiler, the purpose of which is to produce steam for the turbines. The heat transfer surfaces of the boiler are largely composed of pipes, in which flow water and/or steam. If one of these pipes develops a small leakage, which is detected, the damage caused by the leakage is generally to be fixed relatively rapidly and at low expense. If a leakage is not detected, the leakage can cause widespread damages, the repairing of which is difficult and time-consuming.

SUMMARY

In order to prevent widespread damages, monitoring the tightness of the boiler should be arranged such that a leakage is discovered already, when it is relatively small.

In practice, the tightness of a boiler can be monitored by the following methods:

mass balance monitoring;

chemical balance monitoring;

acoustic emission monitoring.

Mass balance monitoring is implemented by calculating the difference between the water and steam flows entering and exiting the boiler. In result of leakage, the difference increases to exceed the norm. For this difference can be set an alarm limit, wherein the alarm activates, when the difference grows to exceed the alarm limit. The magnitude of the alarm limit is influenced by the size of the boiler, the precision of flow measurements and the noise filtration manner of the measurements. When all the flows affecting balance are monitored by flow measurements, which are relatively precise, and the data noise of the measurement is efficiently eliminated, the alarm limit can be set so low that even relatively small leakages are noticeable.

Chemical balance monitoring is implemented using a tracer, which does not exit the boiler along with the steam, wherein the balance has four terms:

tracer flow into the boiler along with the feedwater during the inspection period;

tracer flow out from the boiler along with the exhaust purge during the inspection period;

tracer flow out from the boiler along with a leakage in the evaporator section of the boiler during the inspection period; and change in the amount of tracer (=change in concentration× amount of water of the boiler evaporator) in the boiler evaporator during the inspection period.

By equipping the boiler with suitable measurements, chemical balance can be compiled such that the only unknown in the balance is the leakage flow of tracer from the evaporator section of the boiler. In this case, the leakage flow may be calculated from the balance.

In acoustic emission monitoring, an attempt is made to detect a leakage on the basis of the noise it causes. The airspace of a recovery boiler facility or the (pressure) frame of the boiler can be listened to by suitable sensors.

According to a first aspect of the present disclosure there is provided a method for detecting a boiler leakage, the method comprising:

receiving in an automation system of the boiler an indication of a need to start an automatic sequence;

starting in the automation system, in response to the receipt of said indication, the automatic sequence with the following functions:

stopping the dosing of a tracer into boiler water in the case that the boiler comprises a separate dosing of the tracer;

stopping an exhaust purge flow of the boiler water;

monitoring a property of the boiler water over the duration of an inspection period; and drawing a conclusion regarding a leakage on the basis of said monitoring.

In some embodiments of the present disclosure, the automatic sequence comprises stopping (interrupting) the dosing of the tracer into the boiler water. By dosing is meant here a particular dosing into the feedwater.

In some alternative embodiments of the present disclosure, tracer is not dosed per se, but instead a tracer is naturally contained in the feedwater, wherein its dosing is also not interrupted. Instead of this, to adjust the pH and/or other properties of the boiler water, dosing of the chemical to be dosed is interrupted. Alternatively, to adjust the pH and/or other properties of the boiler water, dosing of the chemical to be dosed is not interrupted.

By automatic sequence is meant here a series of automatic functions (group of functions), which are performed without the intervention of the user or without the significant intervention of the user (in other words non-manually). By boiler water is meant the water circulating in the boiler pipes. By boiler leakage is meant specifically a leakage in the evaporator section of the boiler.

In some embodiments of the present disclosure, said indication is received by automatic means (in other words, without the intervention of the user), for example, from inside the system. In some other embodiments of the invention, the user (operator) can input the start command into the automation system.

In some embodiments of the present disclosure, the indication of a need for starting the automatic sequence (in other words, the indication starting the sequence) is an indication of a possible leakage in the evaporator section of the boiler.

In some embodiments of the present disclosure, an increase in the feedwater-steam difference is used as the indication starting the sequence. In some embodiments of the present disclosure, a rise in the level of acoustic emission is used as the indication starting the sequence. In some embodiments of the present disclosure, a rise in the rpm of the flue gas fans is used as the indication starting the sequence. In some embodiments of the present disclosure, a sudden rise in the pressure of the furnace is used as the indication starting the sequence. In some embodiments of the present disclosure, a sudden fall in the surface level of the steam drum is used as the indication starting the sequence. In some embodiments of the present disclosure, some other change in the measurements of the boiler is used as the indication starting the sequence. In some embodiments of the present disclosure, some combination of the above, which may indicate a leakage in the boiler, is used as the indication starting the sequence.

In some embodiments of the present disclosure, said sequence is started automatically (in other words, without the intervention of the user) in response to the receipt of said indication.

In some embodiments of the present disclosure, the indication of a need to start the automatic sequence is not an indication of a possible leakage, but instead it may indicate, for example, the fulfilment of a temporal condition. Said automatic sequence can be started automatically in an automation system, for example, at defined intervals (for example, once a week).

In some embodiments of the present disclosure, a command given by the user, as received by the automation system, functions as an indication of a need to start the automatic sequence. In these embodiments, the operator can manually give the start command, for example, if he suspects that the boiler has a leakage. When the automation system receives the indication (start command), it starts the automatic sequence.

In some embodiments of the present disclosure occurs: resuming the (normal) dosing of the tracer, if stopped, and the exhaust purge flow once the inspection period has ended.

Resuming the dosing of the tracer and the exhaust purge flow (restarting the dosing of the tracer and the exhaust purge flow) can be included in the functions of said automatic sequence. In some embodiments of the invention, the resuming is carried out after a predefined time interval.

In some embodiments of the present disclosure, in order to stop the dosing of the tracer, the dosing pump or pumps are switched off and/or the doser line valve(s) are closed. The measures are executed under control of the automation system.

In some embodiments of the present disclosure, in order to stop the exhaust purge flow of the boiler water, the valve(s) of the exhaust purge line are closed. The measure is executed under control of the automation system.

In some embodiments of the present disclosure, monitoring is implemented and the conclusion is drawn using only one variable. In some embodiments of the invention, said property of the boiler water is the concentration of the tracer. In some embodiments of the invention, said property of the boiler water is the conductivity of the boiler water. In some embodiments of the invention, said property of the boiler water is the cation-exchanged conductivity of the boiler water. In some embodiments of the invention, the automation system issues a leakage alarm, if the property of the boiler water, during the inspection period, acts according to a predefined criterion. If said property, for example, decreases (specifically decreases evenly) during the inspection period, the automation system issues a leakage alarm. In this case, said predefined criterion is a given change in the property (a decrease, or specifically an even decrease) during the inspection period.

In some embodiments of the present disclosure, said predefined criterion is selected from a group comprising: a change in the property, an even change in the property (which, for example, must be greater than some predefined limit value), a decrease in the property and an even decrease in the property (which, for example, must be greater than some predefined limit value).

In some embodiments of the present disclosure, over the duration of the inspection period is monitored more than one property of the boiler water (for example, two or three of the above said).

In some embodiments of the present disclosure, said property of the boiler water is monitored by measuring the property from a boiler water pipe (for example, from the drain pipe from the steam drum), in which boiler water still flows, even though the exhaust purge flow has been stopped. In these embodiments, as the boiler water sample flow pipe is specifically not used the exhaust purge line of the boiler, but instead a thinner sample flow pipe or, depending on the measurement method, a solution without a sample flow pipe.

In some embodiments of the present disclosure, by stopping the dosing of the tracer and stopping the exhaust purge flow, a closed circuit is formed in relation to the tracer. Said property of the boiler water is monitored by measuring the property from a boiler water pipe, which forms part of said closed circuit.

In some embodiments of the present disclosure, sodium is used as the tracer. In some embodiments of the present disclosure, phosphate is used as the tracer. Tracer can be dosed into the boiler water (into the feedwater) as a compound, for example, in the form of sodium phosphate, wherein sodium, phosphate or both can be used as a tracer. In some embodiments of the present disclosure, sodium is used as the tracer and it is dosed as a sodium salt solution. In some embodiments of the present disclosure, sodium is used as the tracer and it is dosed in the form of lye (NaOH). In some embodiments of the present disclosure, sodium is used as the tracer and it is dosed in the form of sodium sulphate. In some embodiments of the present disclosure, phosphate is used as the tracer and it is dosed as a phosphate compound, which contains no sodium. In some embodiments of the present disclosure, another chemical is used as the tracer. In some embodiments of the present disclosure, a group of chemicals is used as the tracer and/or the tracer is dosed as a combination of various chemicals. In some further embodiments of the present disclosure, silica ($SiO_2$) is used as the tracer, which occurs naturally in the feedwater.

In some embodiments of the present disclosure, the automation system provides, on the basis of the change in said property, a calculated estimate of the size of the leakage. In some embodiments of the present disclosure, if said property of the boiler water changes or decreases evenly, the automation system provides, on the basis of the even change or even decrease, a calculated estimate of the size of the leakage.

In some embodiments of the present disclosure, first the dosing of the tracer is stopped and then the exhaust purge flow. In some other embodiments of the invention, first the exhaust purge flow is stopped and then the dosing of the tracer. In some further embodiments of the present disclosure, the dosing of the tracer and the exhaust purge flow are stopped simultaneously.

In some embodiments of the present disclosure, on the basis of said monitoring, the location of the boiler leakage is determined. For example, if said property of the boiler water in some embodiments of the present disclosure changes or decreases evenly, the leakage is in the evaporator. If instead the property remains the same, there is no leakage in the evaporator, wherein if there is a leakage in the boiler, it is in the superheaters or in the economizers.

In some embodiments of the present disclosure, said exhaust purge flow is only closed after a delay, after stopping the dosing of the tracer. Specifically, if tracer, for example, sodium phosphate, is dosed into the feedwater line upstream of the economizers, the exhaust purge flow can be stopped with a delay. With this kind of implementation for the dosing of the tracer, also after the dosing is interrupted, tracer-containing water flows into the evaporator section of the boiler from the economizers. It is preferable to wait, until the economizers have filled with clean water, and only then to close the exhaust purge flow.

In some embodiments of the present disclosure, the method is implemented as an upper level adjustment.

According to a second aspect of the present disclosure there is provided a system for detecting a boiler leakage, the system being configured to receive an indication of a need to start the automatic sequence, and start, in response to the receipt of said indication, an automatic sequence with the following functions:

stopping the dosing of a tracer into boiler water in the case that the boiler comprises a separate dosing of the tracer;

stopping an exhaust purge flow of the boiler water;

monitoring a property of the boiler water over the duration of an inspection period; and drawing a conclusion regarding a leakage on the basis of said monitoring.

According to a third aspect of the present disclosure there is provided a computer program comprising a program code to be executed on an automation system of a recovery boiler causing the automation system to perform the following functions:

receiving in the automation system of the boiler an indication of a need to start an automatic sequence;

starting in the automation system, in response to the receipt of said indication, the automatic sequence with the following functions:

stopping the dosing of a tracer into boiler water in the case that the boiler comprises a separate dosing of the tracer;

stopping an exhaust purge flow of the boiler water;

monitoring a property of the boiler water over the duration of an inspection period; and drawing a conclusion regarding a leakage on the basis of said monitoring.

The automation system is a computerized system, wherein the computer program can be executed by a processor or processor unit comprised by the system. The computer program contains a program code executable on a computer.

According to a fourth aspect of the present disclosure there is provided a computer program product comprising the computer program according to the third aspect.

According to a fifth aspect of the present disclosure there is provided memory means comprising the computer program or program code according to the third aspect stored thereon.

Presented above are features of various aspects and embodiments of the present disclosure. The embodiments presented above present exemplary implementations, which can be used in various alternative implementations of the present disclosure. Various embodiments of the present disclosure are described or have been described in connection with an aspect or some aspects of the present disclosure. However, corresponding embodiments are to be adapted also to other aspects, and to the embodiments relating to these other aspects. The embodiments or their features can be used independently or in combination with other embodiments.

BRIEF DESCRIPTION OF THE FIGURES

The present disclosure is now described by means of example with reference to the accompanying drawings, in which.

DETAILED DESCRIPTION

It is to be noted that the figures presented are not fully to scale and their purpose is merely only to illustrate the embodiments of the present disclosure.

In the method for detecting a boiler leakage, an indication of a need to start an automatic sequence is received in an automation system of a boiler, and the automatic sequence is started in response to the receipt of said indication.

Figure 1:
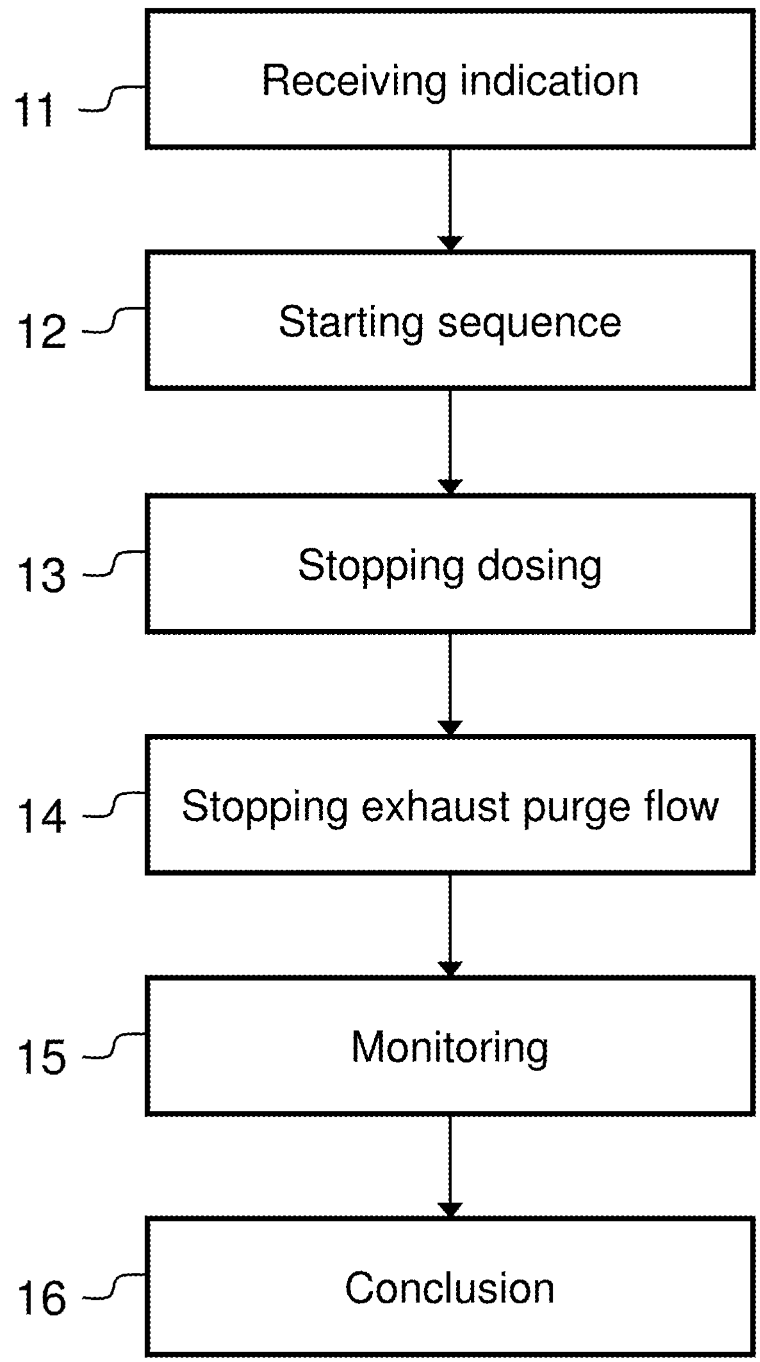
FIG. 1 shows as a flow chart a method according to an embodiment of the present disclosure.

FIG. 1 shows as a flow chart a method according to an embodiment of the present disclosure. In step 11 of the method, in the automation system of the recovery boiler is received an indication of a need to start the automatic sequence. In step 12, the automatic sequence is started in the automation system in response to the receipt of said indication. The automatic sequence comprises the following functions:

stopping the dosing of the tracer into the boiler water (step 13)

stopping the boiler water exhaust purge flow (step 14)

monitoring a property of the boiler water over the duration of the inspection period (step 15), and drawing a conclusion regarding the leakage on the basis of said monitoring (step 16).

Figure 2:
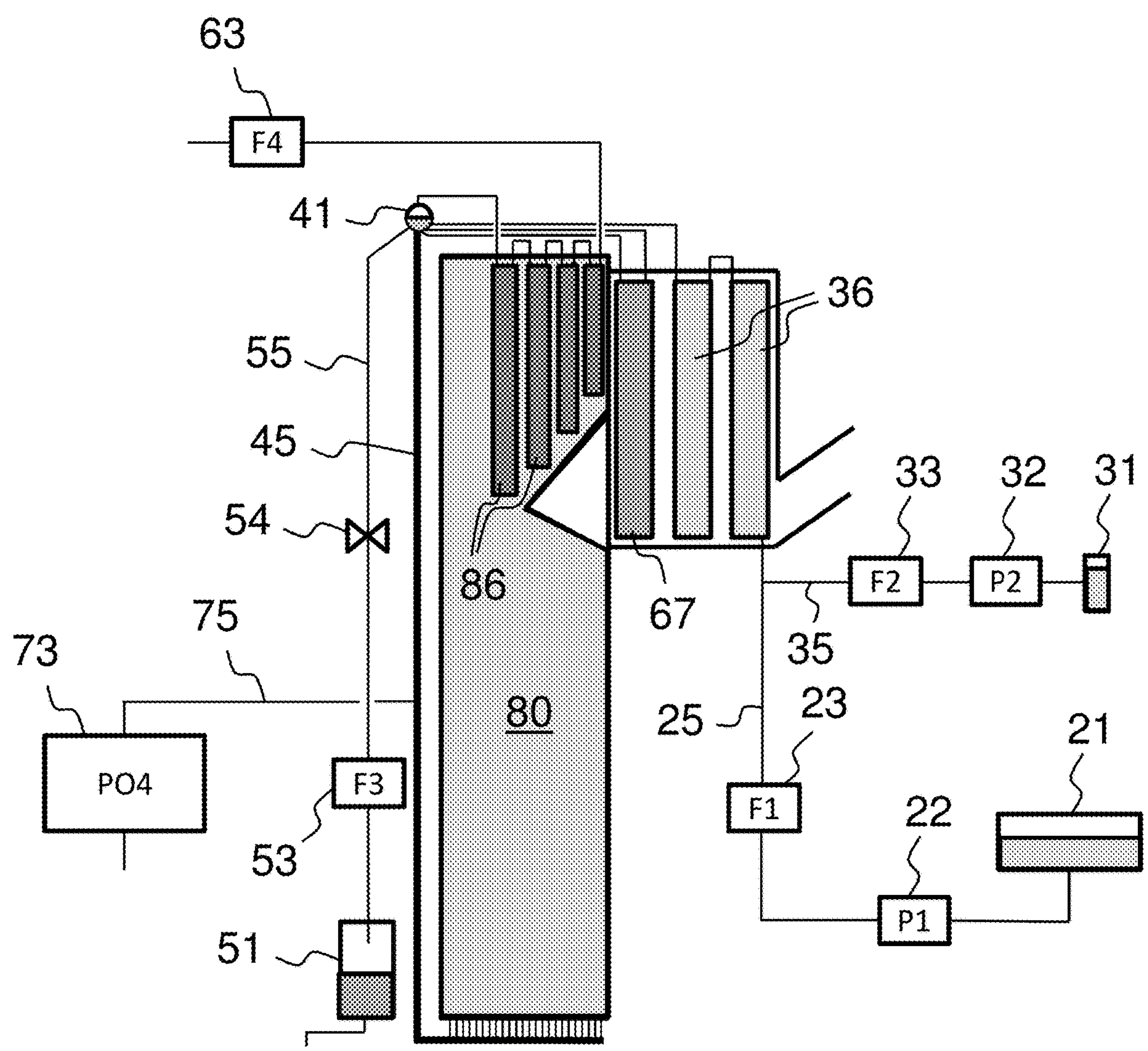
FIG. 2 shows parts of the recovery boiler relating to embodiments of the present disclosure.

FIG. 2 shows parts of the recovery boiler relating to embodiments of the invention. A feedwater pump 22 pumps feedwater from a feedwater container 21 along a feedwater line 25 to feedwater preheaters, i.e. to economizers 36, from which the feedwater migrates to a steam drum 41. The boiler water drains from the steam drum 41 along drain pipes 45 below the boiler or to a lower section, from which the water rises along the edges of a furnace 80 upwards, finally ending up once again in the steam drum. A different drain pipe typically leads to a cooking surface 67 of the boiler from the steam drum 41, and a return pipe back to the steam drum. Water steam flows from the steam drum 41 to superheaters 86, and from there along steam lines to a turbine (not shown). Chemical is dosed into the feedwater from a chemical container 31 by a chemical solution pump 32 along a chemical dosing line 35, for example, for adjusting the pH of the boiler water.

The evaporator section of the boiler includes the furnace 80, the cooking surface 67, the steam drum 41 and drain pipes 45. An exhaust purge line 55 extends from the evaporator section (for example, from the steam drum 41) to an exhaust purge container 51. The exhaust purge flow is adjusted by an exhaust purge adjustment valve 54.

In addition to the exhaust purge line 55, from the evaporator section extends a boiler water sample line 75, from which is measured a predefined property of the boiler water.

The feedwater line 25, the chemical dosing line 35, the exhaust purge line 55 and the steam lines are equipped with flow measurements (flow meters). In the figure, a flow meter of the feedwater line is designated by reference numeral 23, a flow meter of the chemical dosing line by reference numeral 33, a flow meter of the exhaust purge line by reference numeral 53 and a flow meter of the steam lines by reference numeral 63.

The boiler water sample line 75 has a measurement device 73, with which said property of the boiler water is measured.

In the above-said pipes or lines, water can flow either as fluid, as steam or as a water-steam mixture.

FIG. shows the recovery boiler of FIG. 2 complemented by the automation system in certain embodiments of the invention. The automation system 90 is in connection with adjustment, measurement and control devices, such as devices 22-23, 32-33, 53-54, 63 and 73. It controls the functions of the devices and receives information from the devices, such as measurement data and status information.

The function of the method in certain embodiments of the present disclosure is described in the following.

Mass balance monitoring is implemented by calculating the difference between the water and steam flows entering and exiting the boiler. When this so-called feedwater-stream difference increases, it may be an indication of a leakage in the evaporator section of the boiler. When the feedwater-steam difference exceeds an alarm limit, the automation system issues an alarm regarding the increase of the feed-water-steam difference. In the automation system, this functions as an obtained (received) indication of a need to start the automatic sequence.

In this case, in the automation system 90 is started an automatic sequence, in which:

a) The pump 32, which pumps chemical (for example, here sodium phosphate) into the feedwater, stops.

b) If sodium phosphate solution is dosed into the feedwater line 25 upstream of the economizers 36 there starts a delay during which the sodium phosphate-containing water in the economizers 36 is exchanged into water which contains no sodium phosphate. If sodium phosphate solution is dosed directly into the steam drum 41, or into the line between the steam drum and the economizers 36, no delay is required.

c) The valve 54 of the exhaust purge line closes.

d) Once the valve 54 of the exhaust purge line has closed, monitoring of the phosphate concentration or sodium concentration (=tracer) of the boiler water is started: if the value decreases evenly, the automation system 90 issues an alarm regarding a leakage in the evaporator section of the boiler.

e) The automation system 90 reports, on the basis of the decreasing rate of phosphate concentration or sodium concentration, the estimated size of a leakage and always updates the result, when the measurement of the phosphate or sodium concentration of the boiler water provides a new result.

Instead of an increase in the feedwater-steam difference, for example, a rise in the level of acoustic emission, an increase in the rpm of exhaust gas fans, a sudden rise in the furnace pressure, a sudden fall in the surface level of the steam drum, or some other change in the measurements of the boiler, or a combination of these, which may indicate a leakage in the boiler, may be used as the indication starting the sequence.

The sequence stops the dosing of sodium phosphate into the boiler, and also interrupts the flow of sodium and phosphate out from the boiler.

The exhaust purge is closed with a delay, when sodium phosphate is dosed into the feedwater line 25 upstream of the economizers 36, because, in this case, even after interrupting the dosing, sodium phosphate-containing water flows into the evaporator section of the boiler from the economizers 36, until the economizers 36 have been filled with clean water. The required length of the delay depends on the volume of the economizers 36 and the flow of the feedwater.

After the exhaust purge is closed, sodium and phosphate flow out from the evaporator section of the boiler only along the sample line 75, along with the sample flow of the boiler water. The sample flow is usually approximately 1 l/min=0.06 $m^3$/h. Boiler leakages typically start from a small crack such that the size of the leakage in the initial stage is 0.2-0.4 kg/s, i.e., 0.7-1.4 $m^3$/h. The leakages are therefore, already immediately in the initial stage, at least one order of magnitude larger than the sample flow, thus the effect of the sample flow on the sodium and phosphate concentrations of the boiler water is so negligible that it may be disregarded.

When the supply of sodium phosphate is interrupted and the exhaust purge is closed, the chemical balance, from which a leakage can be calculated, now has only two terms. The first term describes the amount of sodium or phosphate escaping from the boiler along with the leakage and the second one the change in the sodium or phosphate inventory of the boiler water during the inspection period. For example, the balance equation may then be presented in the form $$C_{PO4} \cdot v_{leakage} \cdot t = (C_{PO4,t0} - C_{PO4,t1}) \cdot m_{boiler\ water} \quad (1)$$

where $C_{PO4}$=average phosphate concentration of the boiler water during the inspection period (mg/kg or g/t)

$v_{leakage}$=average leakage flow during the inspection period (kg/s or t/h)

t=length of the inspection period (s or h)

$C_{PO4,\ t0}$=phosphate concentration value of the boiler water at the beginning of the inspection period (mg/kg or g/t)

$C_{PO4,\ t1}$=phosphate concentration value of the boiler water at the end of the inspection period (mg/kg or g/t)

$m_{boiler\ water}$=water mass of the evaporator section of the boiler (kg or t).

The equation (1) can be solved for leakage flow $$v_{leakage} = ((C_{PO4,t0} - C_{PO4,t1}) \cdot m_{boiler\ water}) / (C_{PO4} \cdot t)$$

The above-said equation presents the leakage flow on the basis of two quantities, i.e., on the basis of the phosphate concentration of the boiler water and the water mass of the evaporator section of the boiler.

Figure 3:
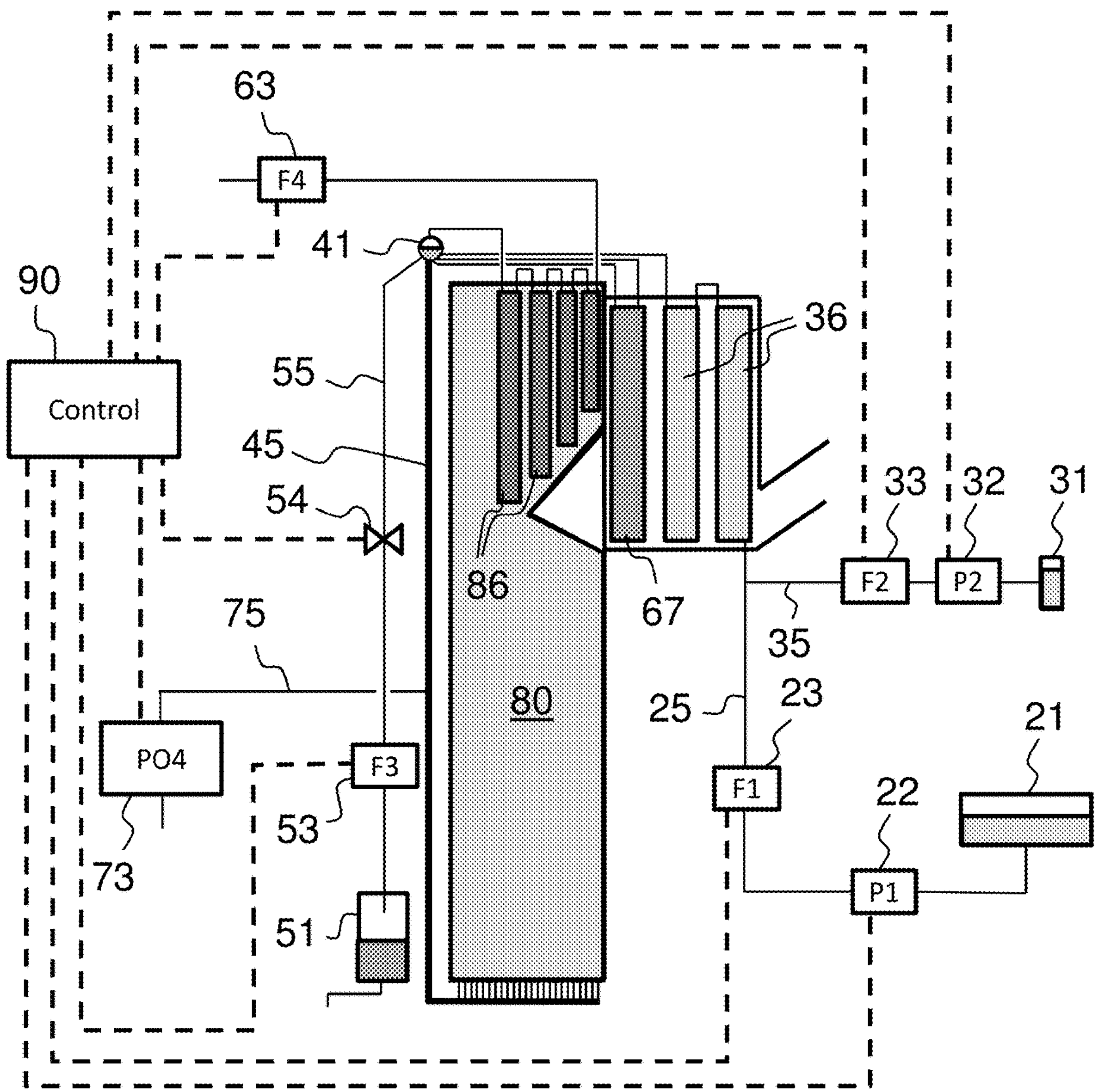
FIG. 3 shows the recovery boiler of FIG. 2 complemented by an automation system in certain embodiments of the present disclosure.

The phosphate concentration in the boiler water can be monitored by a continuously operating phosphate analyser (measurement device 73, FIGS. 2 and 3).

The water mass of the evaporator section of the boiler can, in turn, be estimated on the basis of the water volume of the boiler evaporator and the boiler type. For example, in steam drum boilers operating by natural circulation, approximately half of the water volume is water and half is steam, thus it may be assumed as the first approximation that the mass of the water in the evaporator corresponds to one half of the volume of the evaporator. This estimate can be refined by testing how quickly the boiler water is diluted, when the dosing of sodium phosphate has been interrupted and water is drained out from the evaporator through the exhaust purge. In that case, the exhaust purge flow is the boiler leakage of the equation (1) and its magnitude is known, when the exhaust purge flow is measured by the flow meter 53 of the exhaust purge line 55. The equation (1) can then be solved for the amount of water of the boiler. This amount of water can thereafter be used as a boiler-specific constant of the respective boiler.

A method according to certain embodiments of the present disclosure is illustrated by the following example.

A boiler, the evaporator water mass of which is 100 000 kg, develops a leakage, the magnitude of which is 1 kg/s. The automation system 90 of the boiler continuously monitors the feedwater-steam difference calculated from flow measurements such that an alarm regarding the increase in the difference is issued when the difference exceeds 0.5 kg/s. Because the leakage is greater than the alarm limit, an alarm regarding the leakage is now issued. The boiler personnel (or operator) thus receives the first indication of a leakage in the boiler, but the indication does not tell in which part of the boiler the possible leakage is. In order to verify the leakage, the automatic sequence starts, which stops the dosing of sodium phosphate and closes the valve of the exhaust purge line. If the leakage is in the superheaters 86 or in the economizers 36, thereafter occurs no significant change in the sodium and phosphate amounts in the evaporator section of the boiler, because sodium phosphate does not enter the boiler and sodium or phosphate also do not exit the boiler in significant amounts (migration into the steam of the respective substances is quite minimal). The concentrations of the respective substances in the boiler water thus do not change. If there is then a leakage in the evaporator section, the concentrations of the respective substances begin to decrease evenly.

In an exemplary situation, the phosphate concentration decreases from 3 mg/kg to 2.2 mg/kg in six hours, and the water mass of the evaporator is 100 000 kg. The automation system 90 then estimates the size of the leakage as follows $$v_{leakage}=((3\ \text{mg/kg}-2.2\ \text{mg/kg})\cdot 100\ 000\ \text{kg})/(2.6\ \text{mg/kg}\cdot 6\cdot 3600\ \text{s})$$

$$v_{leakage}=1.07\ \text{kg/s}.$$

The result corresponds well to the feedwater-steam difference in the respective case.

In this case, the automation system 90 has given to the operator two mutually supporting, but from each other completely independent indications of a leakage in the boiler. The method may also be utilized without calculation of the size of the leakage, because a dilution of the boiler water with the exhaust purge closed and the chemical dosing interrupted is a clear indication of a leakage in the evaporator section of the boiler. Already this indication alone, without, for example, an increase in the feedwater-steam difference, is a clear sign that from the evaporator section of the boiler is escaping water, either through leaking valves or a leakage in the pipeline, and as such an adequate cause for executing further measures to assure the safe use of the boiler.

The above-described method for detecting a boiler leakage (or monitoring the tightness of a boiler) can be used in all boilers in which into the boiler water can be dosed chemicals which do not migrate into the steam. The exhaust purge should be arranged such that sample taking from the boiler evaporator does not occur from the exhaust purge line, because, in this case, during the sequence, a sample cannot be obtained from the boiler water for analysing the tracer concentration. Typically, the boiler water sample line is connected, for example, in steam drum boilers, to any of the drain pipes, along which the boiler water drains from the steam drum into the manifolds below the bottom of the furnace. Modifying the sample line to the drain pipe from the exhaust purge line is a relatively small change, thus also in those boilers in which a sample is collected from the exhaust purge line the changes required in order to use the above-described method are to be performed easily.

As mentioned in the preceding, for example, phosphate or sodium can be used as the tracer. These are suitable for the purpose because continuously operating analyzers with which the phosphate and sodium concentrations of the boiler water can be monitored are commercially available from various suppliers. Further, for example, in most steam drum boilers, the boiler water pH is adjusted using sodium phosphate or lye, thus the boiler water contains a relative abundance of both sodium and phosphate, so these do not need to be dosed solely to allow the monitoring of boiler tightness.

The method may also be applied in using some other tracer provided that a continuously operating analyser is available with which the concentration of the respective substance in the boiler water is to be measured and the tracer has no negative effects on the chemistry of the boiler water or on water quality.

In certain embodiments of the present disclosure, a substance which occurs naturally in the feedwater is used as the tracer. Because, for example, silica ($SiO_2$) typically occurs naturally in the feedwater it does not need to be dosed separately by a dosing line. In certain embodiments of the invention, the silica concentration in the boiler water is monitored by a continuously operating analyser which is located, for example, above said sample line 75 (FIGS. 2 and 3). In the presented method, the dosing of boiler chemicals through the dosing line 35 does not need to be interrupted, instead it suffices that the exhaust purge flow is closed. Because silica enters the boiler water continuously, closing the exhaust purge flow leads to a situation in which the silica concentration in the boiler water increases if the boiler is tight (in other words, if the boiler has no leakage). A conclusion regarding a leakage is drawn also in this embodiment based on the monitoring of a property of the boiler water (here: on the basis of monitoring the silica concentration). If the silica concentration increases during the monitoring period as expected this is an indication that the boiler has no leakage. Then again if the silica concentration does not increase as expected this is an indication that the boiler has a leakage.

In boilers in which the pH of the boiler water is not adjusted by sodium phosphate, the method can be utilized by dosing into the boiler water lye or some sodium salt, such as sodium sulphate, for a short time in the beginning of the sequence. In this case, into the sequence is added a step, in which a dosage of lye or sodium sulphate is dosed into the boiler water immediately in the beginning of the sequence. When the dosage is dosed the dosing is stopped and the exhaust purge is closed. From this point onwards the sequence continues in the normal manner. The arrangement requires a separate dosing pump and a container for the respective tracer.

When the substance to be dosed is lye the same dosing pump and container may be also used in cases in which the boiler water pH must be increased.

The measurement of the tracer concentration can be replaced with a measurement of conductivity or cation-exchanged conductivity with certain limits which relate to the concentrations of the tracers and the quality of the water.

In boilers in which sodium phosphate can be used such that both sodium and phosphate concentrations in the boiler water are high (for example, 10 mg/l or more) and the water quality is good such that the water contains no other impurities increasing conductivity the conductivity of the boiler water, in this case, depends almost directly on the concentrations of these chemicals in the boiler water. The effect of the chemicals to be dosed into the feedwater on the conductivity of the boiler water is, in this case, so negligible that it may be disregarded. In this case, the equation for leakage size may be presented in the form $$v_{leakage}=((\text{conductivity}_{t0}-\text{conductivity}_{t1})\cdot m_{boiler\ water})/(\text{conductivity}_{t0\text{-}t1}\cdot t)$$

where $\text{conductivity}_{t0}$=conductivity of the boiler water at the beginning of the inspection period (at time $t_0$)

$\text{conductivity}_{t1}$=conductivity of the boiler water at the end of the inspection period (at time $t_1$)

$conductivity_{t0-t1}$=the average conductivity of the boiler water during the time period $t_0$-$t_1$.

In the respective cases, the difference in leakage flows calculated on the basis of the change in conductivity and the change in concentration of sodium or phosphate is approximately 5-10%, i.e., insignificant in terms of detecting and localizing a leakage.

In boilers in which the pH of the boiler water is adjusted using sodium phosphate monitoring of the tightness of the boiler on the basis of the conductivity of the boiler water can be enhanced by equipping the conductivity measurement of the boiler water with a cation exchanger. The cation exchanger filters out, inter alia, cationic feedwater chemicals from the water so that the error caused by them in estimating the size of a leakage is reduced in comparison to a determination directly by conductivity.

Figure 4:
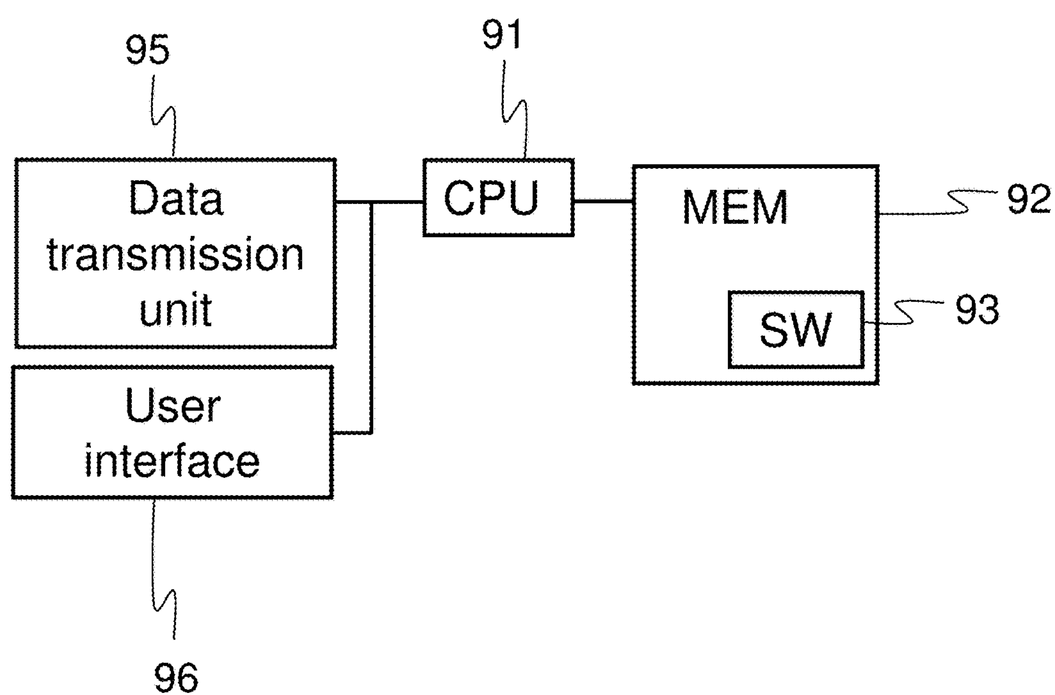
FIG. 4 shows as a block diagram the automation system of a recovery boiler according to an embodiment of the present disclosure.

FIG. 4 shows as a block diagram an example of the automation system 90 which is suitable for implementing certain embodiments of the present disclosure.

The system 90 comprises at least one processor 91 to control the functions of the system and at least one memory 92, which comprises a computer program/software 93. The computer software 93 contains instructions or a program code for the processor 91 to control the system 90. The software 90 may typically comprise an operating system and various applications.

Said at least one processor 91 may be, for example, a central processing unit (CPU), a microprocessor, a digital signal processor (DSP) or the like. FIG. 4 shows one processor but the automation system may typically have several processors.

Said at least one memory 92 may comprise, for example, a read-only memory (ROM), a programmable read-only memory (PROM), an EPROM memory (erasable programmable read-only memory), an EEPROM memory (electronically erasable programmable read-only memory), a RAM memory (random access memory), a flash memory, an optical or a magnetic memory and/or the like. The system 90 may have several memories. The memory can be a part of the system 90, or it may be a separate module to be attached to the system 90. The memory may be intended only for storage of information, or it may also be used for data processing.

The system 90 contains a data transmission unit 95. The data transmission unit 95 offers the system an interface for internal communication using a suitable protocol. Specifically, in some embodiments of the present disclosure, the boiler devices are communicated with through the data transmission unit. Through it, commands will be sent to devices (for example, to measurement devices, valves and pumps) and information is received from said devices.

In order to receive inputs from the user (boiler personnel/operator) and to issue outputs to the user, the system 90 comprises a user interface 96 which may comprise, for example, a display and a keyboard (not shown in the figure).

In addition to the elements presented in FIG. 4, the system 90 may also comprise other elements. Also said measurement devices, valves and pumps may be in some embodiments of the present disclosure incorporated as parts of the system.

The mass balance of the boiler may be presented in the form (see FIGS. 2 and 3)

$$F1=F3+F4+F_v$$

where

F1=feedwater flow

F3=exhaust purge flow

F4=steam flow to the turbine, and $F_v$=leakage flow.

All quantities are over the duration of an adequately long time step, wherein changes in the surface of the steam drum may be disregarded (the balance may also have other terms, for example, steam flow to the sootblowers (on the right side of the balance) and feedwater flow to adjust the temperature of the steam (on the left side of the balance), if the temperature of the steam is adjusted by feedwater and the respective flow is taken from the feedwater line before the flow measurement of the feedwater, but these are not taken into consideration here).

The chemical balance may be presented in the form (all quantities average values during time step t, phosphate as the tracer)

$$\text{phosphate in}=F2\cdot\text{dosing solution phosphate concentration}\cdot t$$

$$\text{phosphate out}=(F3+F_v)\cdot\text{boiler water phosphate concentration}\cdot t$$

$$\text{change in phosphate inventory}=\text{phosphate in}-\text{phosphate out}$$

and on the other hand $$\text{change in phosphate inventory}=\text{change in boiler water phosphate concentration during time step } t\cdot\text{boiler water mass (kg)}$$

In certain embodiments of the present disclosure, the monitoring of the mass and chemical balance is somewhat combined, and it is performed in a simple, easy and robust manner.

Without limiting the protective scope and the interpretation of the claims, in the following is listed some technical effects of one or more presented embodiments. One technical effect is that a leakage may be localized to the evaporator or the superheaters/economizers by just one analyser monitoring the sodium or phosphate concentration of the boiler water or by the boiler water conductivity or cation-exchanged conductivity. In other words, a leakage may be detected and/or localized by monitoring just one variable. Because there is only one required measurement, the method is robust and reliable. A second technical effect is that the size of an evaporator leakage can be clarified by means of only one measurement quantity (variable). Because the quantities required in the calculation are minimal, the error related to the calculation is also minimal, i.e., the calculation functions with precision. A third technical effect relating to embodiments, which are based on measuring conductivity, is that the measurement is simple, maintenance-free, robust and inexpensive in comparison to, for example, measurements of concentration performed by sodium or phosphate analysers.

The preceding description presents non-limiting examples of certain embodiments of the present disclosure. It is clear to the person skilled in the art that features which have been presented only in connection with some embodiment(s) may also be used in other embodiments. It is clear to the person skilled in the art that the invention is not restricted to the presented details, rather the present disclosure may also be implemented in other equivalent manners. In this document, the terms comprise, contain and include are open-ended expressions with no intended exclusivity.

Some features of the afore-disclosed embodiments may be used to advantage without the use of other features. As such, the foregoing description shall be considered as merely illustrative of the principles of the present invention, and not in limitation thereof. The description presented above shall be considered as such as only a specification describing the principles of the present disclosure, and not as limiting the present disclosure. Hence, the scope of the present disclosure is only restricted by the appended patent claims.

The invention claimed is:

1. A method for detecting a boiler leakage, the method comprising:
- receiving in an automation system of the boiler an indication of a need to start an automatic sequence;
- starting in the automation system, in response to the receipt of said indication, the automatic sequence with the following functions:
  - stopping the dosing of a tracer into boiler water in the case that the boiler comprises a separate dosing of the tracer;
  - stopping an exhaust purge flow of the boiler water;
  - monitoring a property of the boiler water over the duration of an inspection period, said property of the boiler water including the concentration of the tracer or the conductivity of the boiler water or the cation-exchanged conductivity of the boiler water; and
  - drawing a conclusion regarding the leakage on the basis of said monitoring.

2. A method according to claim 1, where said indication of a need to start an automatic sequence is an indication of a leakage in the boiler received by automatic means from inside the automation system.

3. A method according to claim 1, where an increase in a feedwater-steam difference is used as the indication starting the sequence.

4. A method according to claim 1, where one of the following is used as the indication starting the sequence: an increase in the feedwater-steam difference, a rise in the level of acoustic emission, an increase in the rpm of flue gas fans, a rise in a furnace pressure, a fall in the surface level of a steam drum, or some combination of these.

5. A method according to claim 1, where said sequence is started automatically in response to the receipt of said indication.

6. A method according to claim 1, the method comprising:
- resuming the dosing of the tracer, if stopped, and the exhaust purge flow when the inspection period has ended.

7. A method according to claim 1, where the monitoring is implemented and the conclusion is drawn using just one variable.

8. A method according to claim 1, in which said property of the boiler water is monitored by measuring the property from a boiler water pipe in which boiler water still flows even though the exhaust purge flow has been stopped.

9. A method according to claim 1, in which by stopping the dosing and stopping the exhaust purge flow, a closed circuit is formed in relation to the tracer and said property of the boiler water is monitored by measuring the property from a boiler water pipe which forms part of said closed circuit.

10. A method according to claim 1, where the automation system issues a leakage alarm if the property of the boiler water acts during the inspection period according to a predefined criterion.

11. A method according to claim 9, where said criterion is selected from the group comprising: a change in the property, an even change in the property, a decrease in the property and an even decrease in the property.

12. A method according to claim 1, in which one or more of the following: sodium, phosphate, and silica is used as the tracer.

13. A method according to claim 1, in which the automation system provides, on the basis of a change in said property, a calculated estimate of the size of the leakage.

14. A method according to claim 1, in which, on the basis of said monitoring, the location of the boiler leakage is determined.

15. A method according to claim 1, in which said exhaust purge flow is stopped only with a delay after stopping the dosing of the tracer.

16. A system for detecting a boiler leakage, the system being configured to receive an indication of a need to start an automatic sequence and start, in response to the receipt of said indication, the automatic sequence with the following functions:
- stopping the dosing of a tracer into boiler water in the case that the boiler comprises a separate dosing of the tracer;
- stopping an exhaust purge flow of the boiler water;
- monitoring a property of the boiler water over the duration of an inspection period, said property of the boiler water including the concentration of the tracer or the conductivity of the boiler water or the cation-exchanged conductivity of the boiler water; and
- drawing a conclusion regarding a leakage on the basis of said monitoring.

17. A computer program embodied on tangible computer-readable medium comprising a program code to be executed on an automation system of a recovery boiler causing the automation system to perform the following functions:
- receiving in the automation system of the boiler an indication of a need to start an automatic sequence;
- starting in the automation system, in response to the receipt of said indication, the automatic sequence with the following functions:
- stopping the dosing of a tracer into boiler water in the case that the boiler comprises a separate dosing of the tracer;
- stopping an exhaust purge flow of the boiler water;
- monitoring a property of the boiler water over the duration of an inspection period, said property of the boiler water including the concentration of the tracer or the conductivity of the boiler water or the cation-exchanged conductivity of the boiler water; and
- drawing a conclusion regarding a leakage on the basis of said monitoring.

18. The system of claim 16, where said indication of a need to start an automatic sequence is an indication of a leakage in the boiler received by automatic means from inside the system.

19. The computer program of claim 17, where said indication of a need to start an automatic sequence is an indication of a leakage in the boiler received by automatic means from inside the automation system.

* * * * *